No. 693,071. Patented Feb. 11, 1902.
R. R. F. RUUD.
APPARATUS FOR USE IN ANGLING.
(Application filed Nov. 29, 1901.)
(No Model.)

Witnesses
E. B. Bolton
Isabella Waldron.

Inventor:
Rudolf Ricard Frithjof Ruud
by Richard
Attorneys

UNITED STATES PATENT OFFICE.

RUDOLF RICARD FRITHJOF RUUD, OF CHRISTIANIA, NORWAY.

APPARATUS FOR USE IN ANGLING.

SPECIFICATION forming part of Letters Patent No. 693,071, dated February 11, 1902.

Application filed November 29, 1901. Serial No. 84,114. (No model.)

*To all whom it may concern:*

Be it known that I, RUDOLF RICARD FRITHJOF RUUD, mechanician, a subject of the King of Sweden and Norway, residing at Karlstadgaden 4 IV, Christiania, Norway, have invented certain new and useful Apparatus for Use in Angling, of which the following is a specification.

This invention relates to apparatus for use in angling and which automatically indicates when a fish bites and also suddenly pulls the line to hook the fish.

The apparatus is arranged in such a manner that it can be adapted for fishing at different depths and for large or small fish.

The invention is illustrated in the accompanying drawings, in which—

Figure 1:
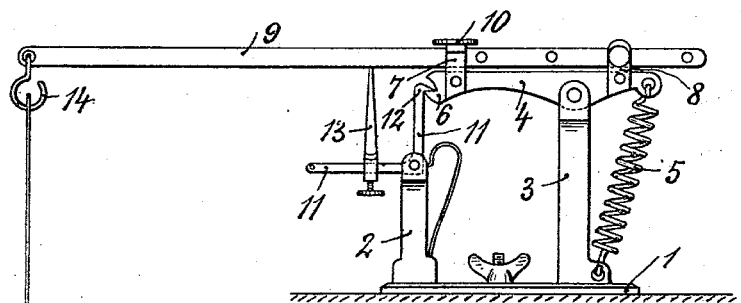
Figure 2:
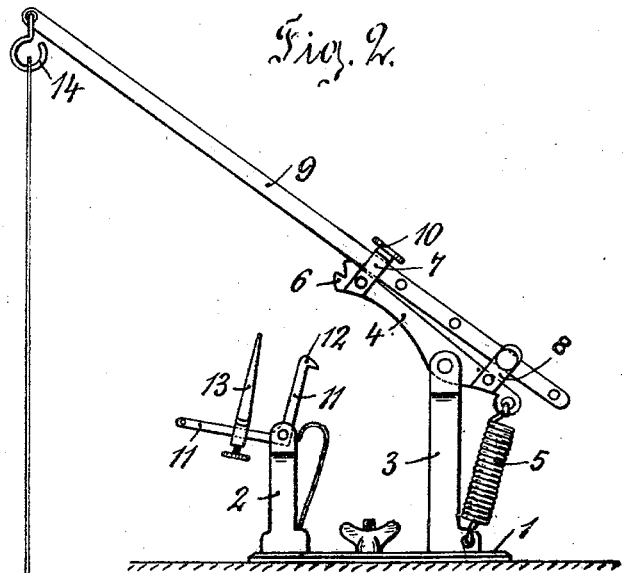

Figure 1 is a side view of the apparatus in the normal or "set" position. Fig. 2 is a similar view showing the position assumed after the bite of a fish.

On the side of the boat there is fixed a plate 1, with two brackets or supports 2 and 3. In the bracket 3 there is hinged a double lever 4, provided at its inner end with a hole in which engages one end of a spring 5, the other end of which is secured to the plate 1 or to the lower part of the bracket or support 3. The outer end of the lever 4 is provided with a hook 6, and to each end of the lever there is secured a socket, (marked 7 and 8, respectively,) in which sockets a rod 9 is movably held, being secured rigidly in the position to which it is adjusted by means of screws. Between the lever 4 and the rod 9 there is play, so that the rod 9 can swing slightly in a direction toward the lever 4. It is, however, prevented by a stop 10 on the part 7 from moving in the opposite direction.

The bracket or support 2 forms a bearing for a bell-crank lever 11, the upright arm of which is provided with a hook 12, which in the set position of the apparatus engages the hook 6, and the horizontal arm of which carries a projecting upright pin 13, capable of being secured at a greater or less distance from the pivot of the bell-crank lever 11. The pin 13 extends upward to such an extent that the rod 9 is applied against the stop 10 when the apparatus is set, as shown in Fig. 1. The line is secured in the hook 14 at the outer free end of the rod 9.

It will be clear that a weight can be employed instead of the spring 5.

The apparatus is employed as follows: The line is dropped into the water and the rod 9 adjusted to such a position that the spring 5 just slightly overbalances the weight of the rod and line. For angling in deep water the rod 9 must be pushed farther inward than for angling in shallow water in order to adjust the weight to be counterbalanced by the spring 5. By altering the position of the pin 13 the sensitiveness of the apparatus can be regulated to the pull of the fish, the sensitiveness being the greatest when the pin is in its outermost position. By suitably regulating the sensitiveness of the apparatus the disadvantage is obviated of the apparatus being unintentionally operated by a slight pull caused by the rocking of the boat or by the biting of very small fish. When the apparatus is suitably adjusted in this manner and the line dropped, then as soon as the said line is pulled the lever 9 pushes the pin 13 downward. By this means the bell-crank lever 11 is turned, thus disengaging the hook 12 from the hook 6. The spring 5 will then suddenly swing the released lever 4, and consequently the arm 9, upward, so that the line instantly fixes the hook. The attention of the fisherman is drawn by the operation of the apparatus, so that it is not necessary, as heretofore, to keep constant attention. The apparatus is again brought to its normal position by pressing down the arm 9 until the two hooks 6 and 12 come into engagement. Several apparatuses of this kind can be fixed upon the same boat and can all be controlled by one man, this being one of the chief advantages attaching to the use of the apparatus.

Having now described my invention, what I claim as new, and desire to secure by Letters Patent, is—

1. An apparatus for use in angling comprising a standard or support, a rocking lever pivotally connected thereto, means for applying tension to one end of said lever, retaining means for holding the other end depressed against said tension, a fishpole connected with said rocking lever to have limited movement thereon, and connections whereby said limited movement will operate to release said retaining means, substantially as described.

2. In combination, a standard or support, a rocking lever carried thereby, a spring exerting tension on one end of said lever, a pawl suitably pivoted and adapted to engage the opposite end of said rocking lever, a fishpole connected to said rocking lever to have limited movement relatively to the same and connections whereby said limited movement operates to release the pawl, substantially as described.

3. In combination, a standard, a rocking lever carried thereby, a spring exerting tension on said rocking lever, a fishpole connected to said rocking lever to have limited movement relative to the same, a spring-pressed pawl adapted to engage the free end of the rocking lever, said pawl having an angular tail and a stop or trigger connected to said tail and extending up in proximity to the fishpole when set, substantially as described.

In witness whereof I have hereunto set my hand in presence of two witnesses.

RUDOLF RICARD FRITHJOF RUUD.

Witnesses:
RICHARD STOKKE,
AUE LAHN.